(12) United States Patent
Barkan

(10) Patent No.: US 6,467,062 B1
(45) Date of Patent: Oct. 15, 2002

(54) DIGITAL DATA (MULTI-BIT) STORAGE WITH DISCRETE ANALOG MEMORY CELLS

(76) Inventor: Mordecai Barkan, 304 Calcaterra Pl., Palo Alto, CA (US) 94306

( * ) Notice: Subject to any disclaimer, the term of this patent is extended or adjusted under 35 U.S.C. 154(b) by 0 days.

(21) Appl. No.: 09/189,260

(22) Filed: Nov. 10, 1998

Related U.S. Application Data

(60) Provisional application No. 60/067,771, filed on Dec. 10, 1997.

(51) Int. Cl.[7] .............................................. H03M 13/00
(52) U.S. Cl. ..................................................... 714/764
(58) Field of Search ................................ 714/758, 752, 714/746; 360/64; 704/243

(56) References Cited

U.S. PATENT DOCUMENTS

| | | | |
|---|---|---|---|
| 4,206,440 A | 6/1980 | Doi et al. ..................... 371/39 |
| 4,415,767 A * | 11/1983 | Gill et al. ..................... 704/243 |
| 4,539,683 A | 9/1985 | Hahn et al. ..................... 371/15 |
| 4,694,456 A | 9/1987 | Morita et al. ................... 371/38 |
| 4,849,833 A * | 7/1989 | Yoshimura et al. ............ 386/49 |
| 6,078,693 A * | 6/2000 | Kawamura et al. .......... 382/238 |
| 6,081,398 A * | 6/2000 | Ozue ............................ 360/64 |

* cited by examiner

*Primary Examiner*—Phung M. Chung

(57) ABSTRACT

The present invention provides means to trade Ns (discrete analog storage media noise) with Np (process contributed noise), thus allowing for storage of more bits per memory cell than the amounts attainable by the common practice. The storage media may be of any analog type, such as FLASH, RAM (D or S), EPROMS of various types and even used with continuous analog data storage. By transforming the digital data prior to storage and store the transformed data is analog data, results an improvement in total S/N (Signal to Noise ratio), allowing for better utilization of discrete analog memory when compared with the implementation of conventional approaches. The better utilization is measured by the average amount of bits of data stored in each memory cell.

23 Claims, 6 Drawing Sheets

| | 1 | 2 | 3 | 4 | 5 | |
|---|---|---|---|---|---|---|
| | Value | 5 bits input | Output | Scaled Input | Error | Comments |
| | 0 | 0 ; 3 | -2 ; 96 | 0 ; 96 | -2 ; 0 | |
| | 1 | -9 ; 6 | -288 ; 191 | -288 ; 192 | 0 ; -1 | |
| | 2 | 13 ; -3 | 415 ; -94 | 416 ; -96 | -1 ; 2 | |
| | 3 | 11 ; -5 | 346 ; -158 | 352 ; -160 | -6 ; 2 | |
| | 4 | 1 ; 2 | 32 ; 66 | 32 ; 64 | 0 ; 2 | |
| | 5 | 16 ; 2 | 511 ; 60 | 512 ; 64 | -1 ; -4 | |
| | 6 | 0 ; 9 | 1 ; 289 | 0 ; 288 | 1 ; 1 | |
| | 7 | 10 ; -3 | 323 ; -94 | 320 ; -96 | 3 ; 2 | |
| | 8 | 7 ; -1 | 223 ; -31 | 224 ; -32 | -1 ; 1 | |
| | 9 | 13 ; 8 | 416 ; 256 | 416 ; 256 | 0 ; 0 | No Error |
| | 10 | 14 ; -15 | 444 ; -481 | 448 ; -480 | -4 ; -1 | |
| | 11 | 9 ; 7 | 283 ; 225 | 288 ; 224 | -5 ; 1 | |
| | 12 | -14 ; -12 | -447 ; -383 | -448 ; -384 | 1 ; 1 | |
| | 13 | -16 ; 10 | -516 ; 325 | -512 ; 320 | -4 ; 5 | |
| | 14 | 4 ; 13 | 125 ; 417 | 128 ; 416 | -3 ; 1 | |
| | 15 | -6 ; 11 | -201 ; 351 | -192 ; 352 | -9 ; -1 | Largest error |
| | 16 | 0 ; -4 | 0 ; -128 | 0 ; -128 | 0 ; 0 | No Error |
| | 17 | -9 ; -13 | -286 ; -411 | -288 ; -416 | 2 ; 5 | |
| | 18 | -8 ; -12 | -253 ; -383 | -256 ; -384 | 3 ; 1 | |
| | 19 | -7 ; -12 | -215 ; -388 | -224 ; -384 | 9 ; -4 | Largest error |
| | 20 | -10 ; -12 | -320 ; -388 | -320 ; -384 | 0 ; -4 | |
| | 21 | -9 ; -2 | -287 ; -64 | -288 ; -64 | 1 ; 0 | |
| | 22 | -7 ; 8 | -221 ; 251 | -224 ; 256 | 3 ; -5 | |
| | 23 | 12 ; 3 | 383 ; 98 | 384 ; 96 | -1 ; 2 | |
| | 24 | 8 ; 11 | 259 ; 351 | 256 ; 352 | 3 ; -1 | |
| | 25 | 2 ; -2 | 62 ; -65 | 64 ; -64 | -2 ; -1 | |
| | 26 | -11 ; 7 | -349 ; 221 | -352 ; 224 | 3 ; -3 | |
| | 27 | -15 ; -2 | -478 ; -67 | -480 ; -64 | 2 ; -3 | |
| | 28 | 13 ; -3 | 415 ; -95 | 416 ; -96 | -1 ; 1 | |
| | 29 | -13 ; 2 | -413 ; 59 | -416 ; 64 | 3 ; -5 | |
| | 30 | -12 ; -4 | -385 ; -123 | -384 ; -128 | -1 ; 5 | |
| | 31 | 11 ; -12 | 359 ; -383 | 352 ; -384 | 7 ; 1 | |

Figure 10

DIGITAL DATA (MULTI-BIT) STORAGE WITH DISCRETE ANALOG MEMORY CELLS

CROSS REFERENCE TO RELATED APPLICATIONS

The present application is related to provisional patent application Ser. No. 60/067,771, filed Dec. 10, 1997 entitled "Digital Data (Multi-Bit) Storage With Discrete Analog Memory Cells", and the benefit of that earlier Dec. 10, 1997 filing date is claimed for the present application in accordance with 35 U.S.C. § 119 (e)(1).

FIELD OF THE INVENTION

The present invention relates generally to storage of digital data by means of analog storage and more specifically discrete analog storage.

BACKGROUND OF THE INVENTION

The common practice for storing multi-bit digital data by means of discrete analog media is carried out by allocation of distinguishable levels of voltage/current to numerical multi-bit values associated with the stored information per cell. The amount of data/bits stored in each cell is a function of the number of levels given as a value m, where m is equal or less than $\log_2(M)$, where M is the number of the levels. This is also referred to as quantization or multi-level storage.

The number of levels (which contains the multi-bit information) stored in each cell is limited by the amount of uncertainty in the values of the levels when read from the cell during the reading process (the uncertainty may be referred to as storage noise). This difference between the write and read values might be such that a different value from the one originally written may be interpreted in the read process, which can cause an error. As the number of levels assigned to a cell increases, the probability of errors grows as well. To allow an accurate recovery of the original data, ECC (Error Control Coding) means are employed.

Various applications require different requirements of probability for errors. Thus flexibility in the storage process is advantageous. When more errors are allowed, the number of distinct storage values allocated may be increased, which derives higher number of bits stored per cell.

SUMMARY OF THE INVENTION

It is an object of the present invention to provide digital data storage with discrete memory cells. A storage memory is provided for storing digital data which includes digital signal processing (DSP) means for orthogonally transforming a digital data bit stream having a stored data component so as to provide improved data power; means for converting the transformed digital data to form analog data; and discrete analog memory means for storing the analog data.

In one preferred embodiment, the present invention provides means to trade Ns (discrete analog storage media noise) with Np (process contributed noise), thus allowing for storage of more bits per memory cell than the amounts attainable by the common practice. The storage media may be of any analog type, and even used with continuous analog data storage. Analog storage is referred here as the general case that describes all cases which store more than one bit per cell or the storage media is capable of storing more binary levels (more than two levels.)

The present invention takes advantage of coding the data for storage by means of orthogonal vectors (Dictionary of Science & Technology, by Wordsworth Editions Ltd, 1995, ISBN 1-85326-351-6, page 634), similar to the use of such means in Communications. Actually, every implementation used in communications system to improve Signal-to-Noise-Ratio of discrete data sequences, is applicable for discrete analog storage.

By transforming the digital data prior to storage and store the transformed data as analog data, results an improvement in total S/N (Signal to Noise ratio), allowing for better utilization of discrete analog memory when compared with the implementation of conventional approaches. The better utilization is measured by the average amount of bits of data stored in each memory cell.

The present invention may be implemented by using various means of data transformation. It is important to distinguish between this step and ECC (Error Control Coding) means which are allowing for the recovery of signal/data in noise, without the improvement of S/N. Means of ECC are applicable here as complementary means to cope with errors in the digital data after the inverse transformation.

The process has two main steps:
1. Error Correction Control.
2. Transformation of the resulting bit/word stream.

The reason for mentioning of ECC with the present invention is because it needs to be properly implemented with the suggested new processing. The application of this means may be carried out by conventional means, but it is clear that new techniques will be developed to take advantage of the a priori known inverse transformed data.

After applying ECC and adding the required bits/data, the resulting bit/data streams are organized in blocks of n words each, with m bits in each word. Contrary to conventional implementation that stores these words to n discrete analog cells, the present invention suggests that these n data values will be transformed to form a new block of n' words with m' bits each. The resulting block of data is stored in n' discrete analog memory cells. The selection of the Transformation, n, m, n' and m' is made in such way to improve S/Ns (Signal to Storage Noise ratio) while maintaining low processing noise (Np), where Ns is the noise generated by the storage media and is added (or multiplied) to the analog values during the read process. Ns is a function of various arguments such as: process, technology, temperature, time, radiation—usually given as probability distribution function.

The Transformation techniques may vary in many ways and may be selected from known functions such as: FFT/DFT (complex or real), DCT, Hartley (FHT), Wavelets, Chebyshev Polynomials, Fractals and the like. The selection of the Transformation (and n, m, n' and m') is done to allow the addition of processing noise (Np) to storage noise (Ns), in controlled manner, thus the total noise levels after the processing will be below the storage noise (Ns). Other considerations are issues related to required BER (Bit Error Rate) and ECC.

Since the exact contribution of the processing noise may be computed before the actual storage of the data, further improvement may be gained by optimizing the ECC (Error Control Coding) means, and minimize the overhead contributed by the ECC to achieve a certain BER (Bit Error Rate).

Other objects, features and advantages of the present invention will become apparent from the following detailed description when taken in conjunction with the accompanying drawings.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 10 shows an example of FFT/IFFT Processing Noise impact on data values according to the present invention.

DETAILED DESCRIPTION OF ILLUSTRATIONS AND PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 1:
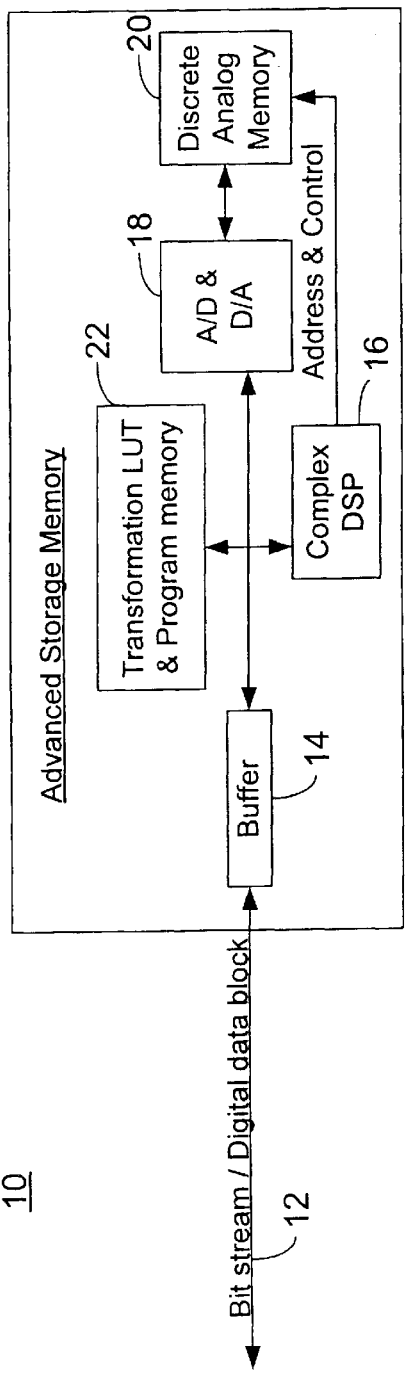
FIG. 1 shows a general outline of a system to be used for implementing multi bit storage, utilizing DSP (Digital Signal Processing) algorithms.

FIG. 1 depicts the main components of a storage system 10 designed for storage of digital data by means of a discrete analog memory. The digital data is delivered to the storage system via a digital input as a bit stream or over a bus 12, and is accumulated in a temporary memory, the buffer unit 14. Once a block of data, n words-m bits, is available for process, the DSP (Digital Signal Processor) 16, which represents either a simple logic circuit or a complex processor, processes the block of data and generates a new block of data with n' words-m' bits each.

The block of data is then converted by means of an A/D 18 to analog values to be stored in the storage media (discrete memory cells) 20. The DSP 16 carries out the computation in accordance with the program to result in the transformation, and may utilize in the process various means, such as LUT (Look Up Tables) 22.

Once the transformation is done, the n' data values are rounded to m' bits and by means of a m' bits D/A 18, converted to analog values and stored in this form to the discrete memory cells 20. When the stored data is needed, the analog values are read from the memory cells 20 by means of a m" bits A/D 18, and a block of n' words-m" bits is stored to the buffer 14. When the n' words are available for processing, the DSP 16 is computing the inverse transformation. The resulting block of n data blocks words are translated to an m bits each. Although the ECC (Error Correction Control) is not detailed in this document, it is worth noting that the DSP unit may be used for the computation required for this process.

Figure 2:
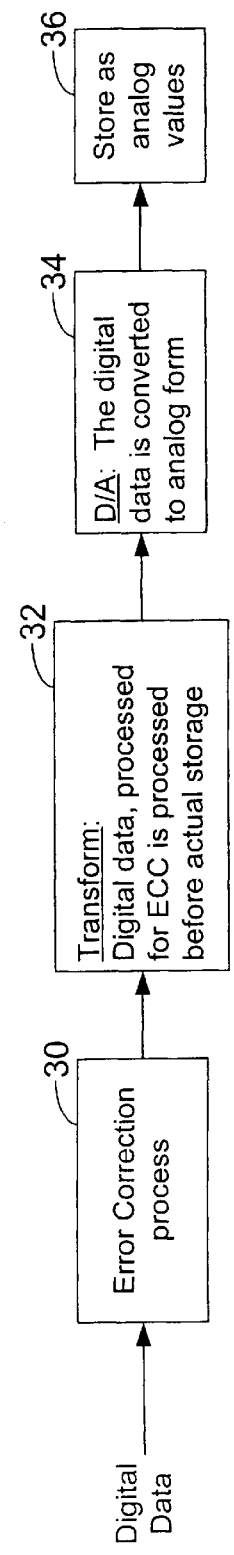
FIG. 2: shows the main steps of the write process according to the present invention.

FIG. 2 depicts a typical storage process according to the present invention. The digital data to be stored, is first processed for error detection and correction at stage 30, followed by a transformation at stage 32 to improve S/N ratios in the reading/retrieval process. At stage 34, the resulting data is converted by means of a D/A (Digital to Analog) converter to an analog value to be stored at stage 36 in the Discrete Analog Storage.

Figure 3:
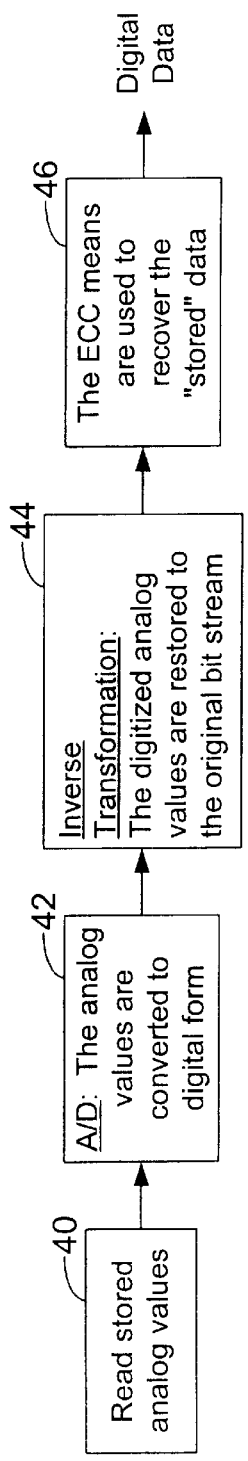
FIG. 3 shows the main steps of the read process according to the present invention.

The retrieval process main steps according to the present invention are shown in FIG. 3. At stage 40, the analog values are read from the storage media and then at stage 42 the analog values are converted to a digital representation by means of the A/D (Analog to Digital) converter. At stage 44, the digital data is then inverse transformed (restored to the original bit stream) into data that at stage 46 is further checked for errors and corrected if found.

Figure 4:
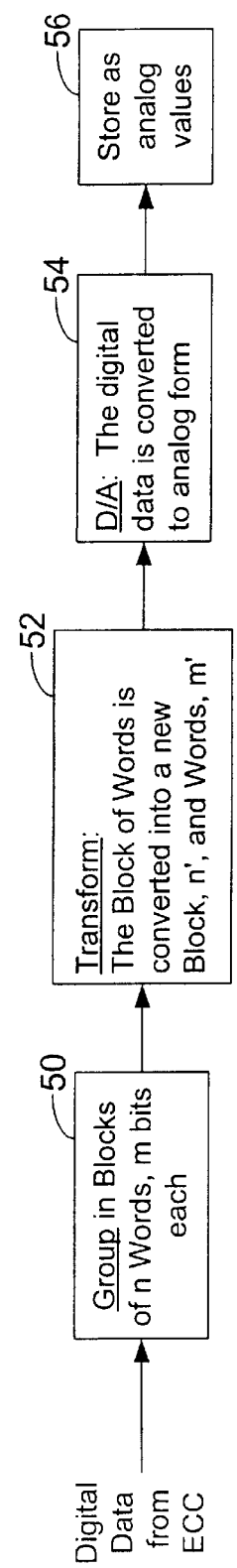
FIG. 4 shows the transformation/encoding process according to the present invention.

FIG. 4 shows in more detail the encoding process according to the invention, which is the storage of digital data after the ECC process. At stage 50, the first step, the digital data is grouped in n words with m bits each. At stage 52, the resulting block of data is then processed and transformed into a new block of n' words with m' bits each. At stage 54, by means of m' bits D/A converter the digital data is converted to an analog value to be stored at stage 56.

Figure 5:
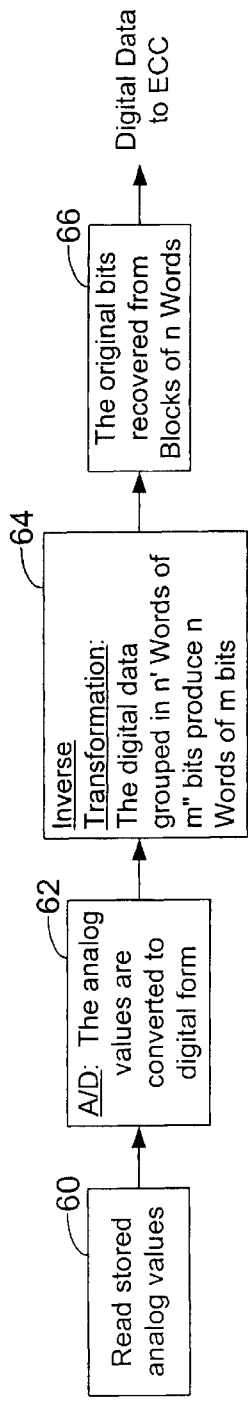
FIG. 5 shows the inverse-transformation/decoding process according to the present invention.

FIG. 5 shows the details of the read process according to the present invention. At stage 60, the analog data values are read from the analog storage. At stages 62 and 64, the read analog values are converted by means of an m" bits A/D into m" bits words which are then grouped into blocks of n' words. The n' words blocks of data are inverse transformed, and the inverse transformed values are further processed, at stage 66, to generate the original n words of m bits each. Since all the process is carried in a "noisy" environment, and errors might be introduced, the block of n words is transferred to the ECC unit for error detection and correction.

Figure 6:
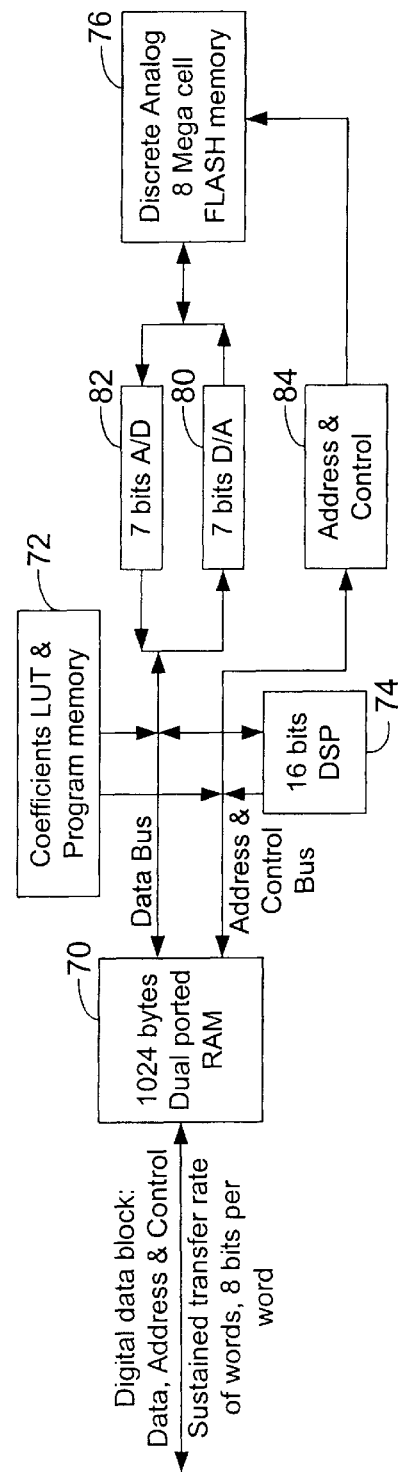
FIG. 6 shows a 5 bit storage per cell implementation example according to the present invention.

FIG. 6 shows a specific embodiment of an advanced storage memory according to the present invention. One skilled in the art could modify the components and the algorithm to fit various implementations. In FIG. 6, the data to be stored is transferred from the main system to a temporary buffer, the 256 byte Dual Ported RAM 70, which is designed to allow simultaneous access to the memory from the advanced storage and the main system. A non-volatile memory 72 contains the DSP program memory and coefficients used in the transformation process and the ECC. The DSP 74 is fulfilling the tasks of the ECC and transformation described in previous sections. The data is stored in the discrete analog flash memory 76. The interface to the DSP is via a 7 bits D/A 80 and 7 bits A/D 82. The control and addressing of the analog memory 76 is made by the DSP 74 via address and control unit 84.

Figure 7:
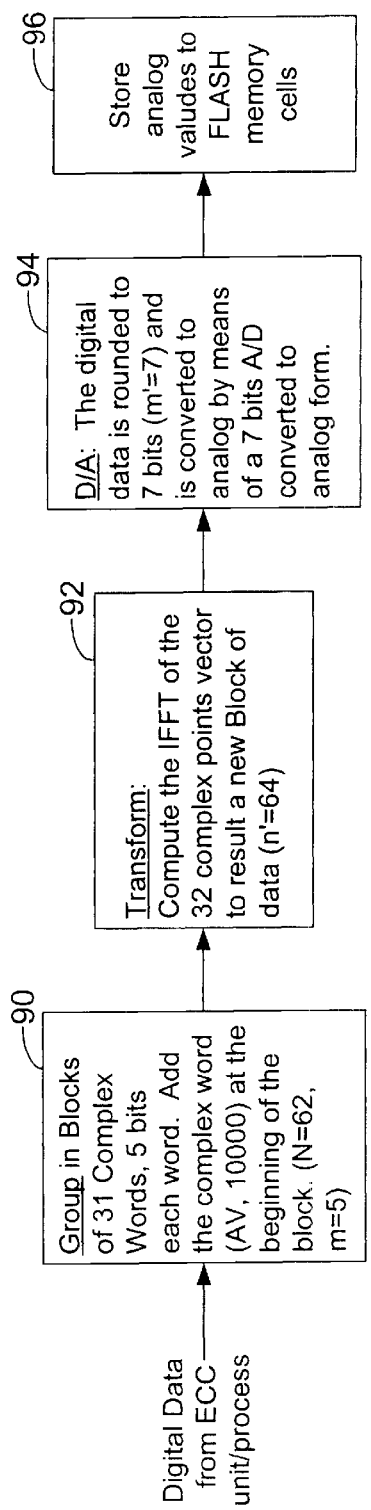
FIG. 7 shows a 5 bit storage write example according to the present invention.

FIG. 7 shows the details of the specific embodiment write process according to the present invention and focuses only on the present invention portion (the ECC, although carried out by the DSP, is not described here). In FIG. 7, at stage 90, the digital data, after going through the ECC process, is grouped in 62 words of 5 bits each organized as a vector of 31 complex values. A complex value (AV, 10000) is added at the head of the group to complement it to a complex vector of 32 points. AV is a 8 bits value of the average of the 62 values. At stage 92, the 32 point complex vector is then transformed by the IFFT (Inverse Fast Fourier Transform)

well known algorithm, to create a 32 complex values vector. The values of this vector are then scaled and rounded to 7 bits, while maintaining the full dynamic range of 7 bits. At stage 94, the resulting 64 values are then converted by means of the 7 bits D/A to analog values to be stored, at stage 96, to the discrete analog flash memory.

Figure 8:
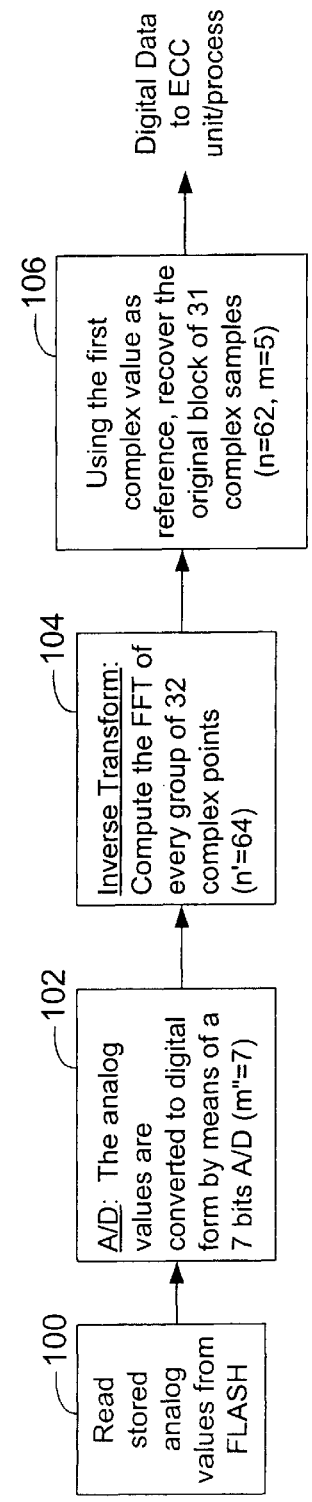
FIG. 8 shows a 5 bit storage read example according to the present invention.

FIG. 8 shows the details of the read process, for the above specific embodiment shown in FIG. 6. In FIG. 8, at stage 100, the analog values are read from the flash memory, and at stage 102, by means of a 7 bits A/D, are converted to digital representation. At stage 104, the digital data is then grouped into the 64 points that were originally used in the write process. Each block of 64 values is organized as a 32 complex values vector and the FFT (Fast Fourier Transform) algorithm is computed. The first complex value is used for noise estimation and calibration. At stage 106, the 62 original values are computed and rounded to 5 bits. Since some errors may occur in the process, the block is transferred to the ECC for further processing: error detection and correction.

Figure 9:
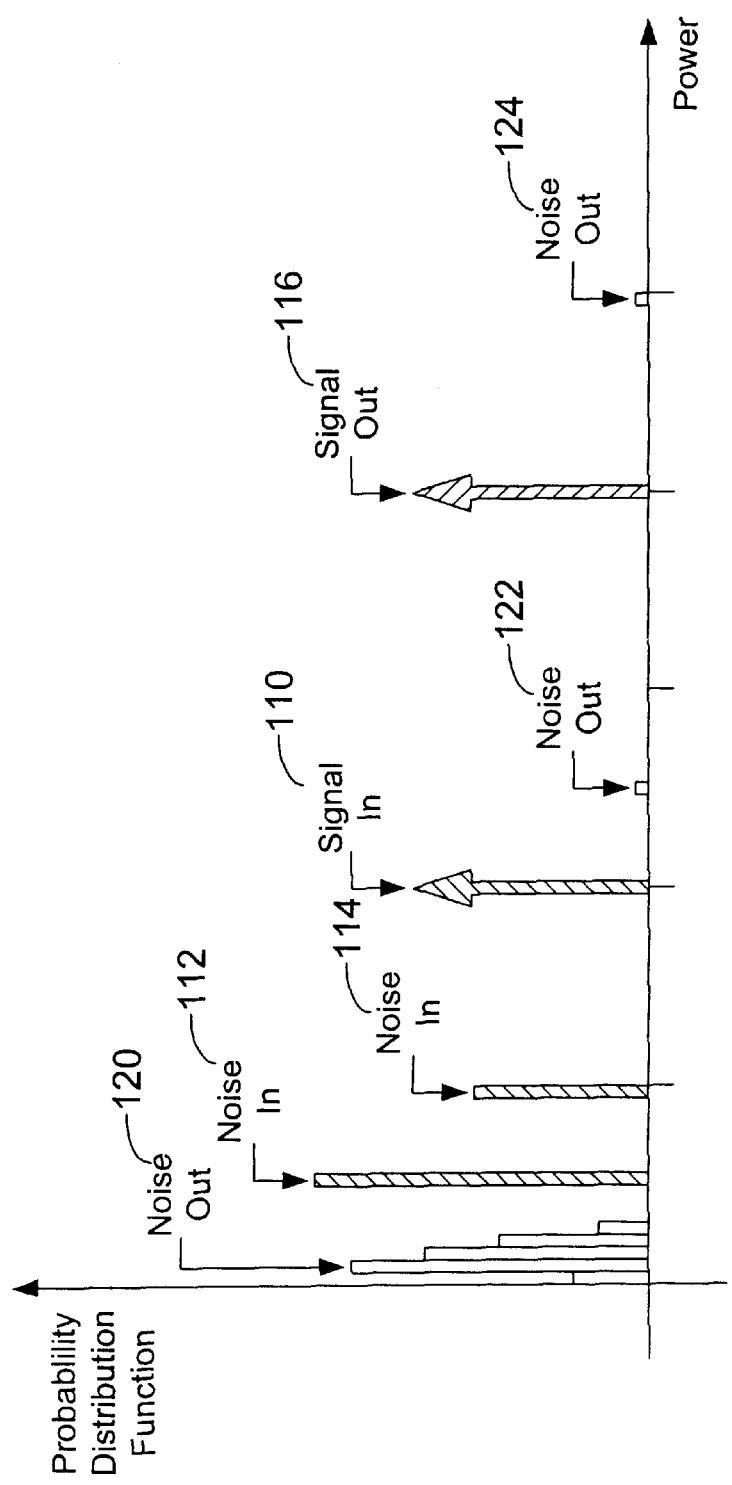
FIG. 9 shows an illustration of processing impact on storage noise vs signal.

FIG. 9 shows how the processing according to the present invention may impact the noise in ways that reduce the probability of error while improving the relative signal power. The Signal In component 110 represents a stored value using the conventional quantized levels approach. The Noise In components 112, 114 represent uncertainties in the stored values as potential changes in the values read, in the specific example, half and quarter of the minimum quantization levels. This allows for recovery of data only if it is really slightly larger then the Noise In component 114 (distinguishing clearly between the various data levels).

Since the proposed processing results coherent processing of the stored signal—for example IFFT before storage and then FFT for the reading process—the data power is "improved" (signal Out component 116) while the Noise Out components 120, 122, 124 power distribution is modified to allow some very high values but with very low probability of occurrence, thus allowing data recovery by means of ECC with high (fully controlled in a specific embodiment) probability and guarantee a very low error rate. By concentrating the Noise Out component 120 in the range close to zero, the quantization levels of the signal before the storage process may be decreased so the values stored may be denser.

FIG. 10 shows a table which depicts the noise for a specific embodiment in which the transformation algorithm is 32 point complex IFFT and FFT. The Signal In component (it should be recognized that this is the expected signals after the inverse transformation) before the processing is 5 bits (column 2). The input complex vector of 32 points is going through a 32 point complex IFFT by means of a 16 bit radix 2, block floating point processor. The output of the process is quantized to 7 bits and stored by means of a 7 bits D/A to the memory.

In the particular example, it is assumed that there is no storage noise thus the same data exactly may be read from the memory. The 32 point complex vector is now going through the FFT process and results in the Output column (column 3). This output is compared to the scaled by 32 input (column 4), to allow the comparison to the input signal; the Scaled Input represents the data in (column 2) multiplied by 32 (column 4). The Error column (column 5) contains the difference values between the processed data (Column 3) and the input data (column 4). Careful review of the error demonstrate maximum values of 9 which is less then the threshold of the error in data recovery, which is 16.

Since the Storage Noise, after the process is added to this values (signed values), the values which show higher error are more susceptible to the noise added by the storage (if the noise model is well known and modeled, there might obtain even better understanding and control of the process). Since the transformation may carried out prior to the actual storage, this apriori knowledge may be used in implementing ECC algorithm that deal with emphasis on values with higher probability of errors to be corrected.

As should be apparent, the present invention provides (1) transformation of digital data prior to the storage in discrete analog media to improve system total signal to noise ratio; (2) exact measurement of processing noise prior to actual storage of the data; and (3) optimization of ECC to the exact processing noise.

The foregoing descriptions of specific embodiments of the present invention have been presented for purposes of illustration and description. They are not intended to be exhaustive or to limit the invention to the precise forms disclosed, and it should be understood that many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A storage memory for storing digital data comprising:
    digital signal processing (DSP) means for transforming a digital data bit stream having a stored data component so as to provide an improved signal to noise ratio by altering levels associated with the digital data bit stream;
    means for converting the transformed data to form analog data; and
    discrete analog memory means for storing the analog data.

2. The storage memory of claim 1 wherein the digital data bit stream is organized into blocks of data having n words in each block with m bits in each word and wherein the transformed bit stream is formed into new blocks of n' words in each new block with m' bits in each new word.

3. The storage memory of claim 2 wherein n' and m' are equal to or greater than n and m, respectively.

4. The storage memory as in claim 3 further including error correction process (ECC) means for forming ECC coded digital data corresponding an original digital bit stream prior to a data transformation.

5. The storage memory as in claim 4 wherein the digital data stream has signal in components and noise in components, the storage memory further including means for coherently processing the stored analog data to form improved signal out components while forming noise out components which are modified to have some relatively high values, the ECC means providing data recovery with a relatively low error rate.

6. The storage memory as in claim 5 including means for concentrating the noise out components in a range close to zero to allow for decreasing quantization levels of the analog data before storage so that stored values associated with the analog data are denser for a given error rate.

7. The storage memory as in claim 6 including:
    means for reading the analog data;

means for converting the analog data to form digitized analog data; and means for restoring the digitized analog data to the digital data bit stream.

8. The storage memory as in claim 7 including DSP means for recovering the digital data bit stream from the analog data.

9. The storage memory as in claim 8 including:

means for grouping the ECC coded digital data into blocks of n words of m bits each;

means for converting the blocks of words formed by grouping the ECC coded digital data into new blocks of n' words of m' bits each; and means for converting the ECC coded digital data to form the analog data to be stored in the discrete analog memory means.

10. The storage memory as in claim 9 including:

means for reading the stored analog data;

means for converting the read analog data to form digital data;

means for grouping the digital data into n' words of m" bits;

means for grouping the digital data of n' words of m" bits to form n words of m bits; and means for recovering the digital data bit stream from the block of n words.

11. The storage memory as in claim 5 wherein the means for coherently processing the second signal includes means for performing at least one of an Inverse Fast Fourier Transform (IFFT) and a Fast Fourier Transform (FFT).

12. The storage memory as in claim 5 wherein the means for coherently processing the stored analog data to form the improved signal out components while forming noise out components which are modified to have some relatively high values include means for altering data power associated with the stored analog signal and means for altering power distribution associated with the noise out components.

13. In a storage memory for storing digital data, a method comprising:

transforming a digital data bit stream having a stored data component so as to provide an improved signal to noise ratio by altering levels associated with the digital data bit stream;

converting the transformed digital data to form analog data; and storing the analog data.

14. The method as in claim 13 including organizing the digital data bit stream into blocks of data having n words in each block with m bits in each word, wherein the transformed bit stream is formed into new blocks of n' words in each new block with m' bits in each new word.

15. A memory device, the memory device being arranged to store digital data, the memory device comprising:

a first transformer, the first transformer being arranged to process the digital data for error detection and error correction, the first transformer further being arranged to transform the processed digital data to improve a signal to storage noise ratio associated with the digital data when the digital data is retrieved substantially by altering levels associated with the digital data bit stream;

a first converter, the first converter being arranged to convert the transformed digital data into at least one analog value; and an analog storage mechanism, the analog storage mechanism being arranged to store the at least one analog value.

16. The memory device of claim 15, further including:

a reader, the reader being arranged to retrieve the at least one analog value from the analog storage mechanism;

a second converter, the second converter being arranged to convert the at least one analog value into a digital representation; and a second transformer, the second transformer being arranged to transform the digital representation into the digital data.

17. The memory device of claim 16 wherein the second transformer is further arranged to check for errors associated with a transformation of the digital representation into the digital data and to correct for errors associated with the transformation of the digital representation into the digital data.

18. The memory device of claim 17 wherein the overall transformer is a digital signal processing mechanism.

19. The memory device of claim 15 wherein the analog storage mechanism is a discrete analog flash memory.

20. The memory device of claim 15 wherein the processed digital data is organized in blocks of n words each, each of the n words including m bits, and the transformed digital data is organized in blocks of n' words each, each of the n' words including m' bits.

21. The memory device of claim 20 wherein the n words, the m bits, the n' words, and the m' bits are selected by the transformer to improve the signal to storage noise ratio while allowing a relatively low processing noise to be maintained.

22. The memory device of claim 20 wherein the first transformer is arranged to perform an inverse fast Fourier transform to transform the processed digital data, and the second transformer is arranged to perform a fast Fourier transform to transform the digital representation.

23. The storage memory as in claim 15 wherein the first transformer is arranged to transform the processed digital data to improve the signal to storage noise ratio associated with the digital data when the digital data is retrieved substantially by decreasing quantization levels associated with the digital data bit stream.

* * * * *